Figure 1:
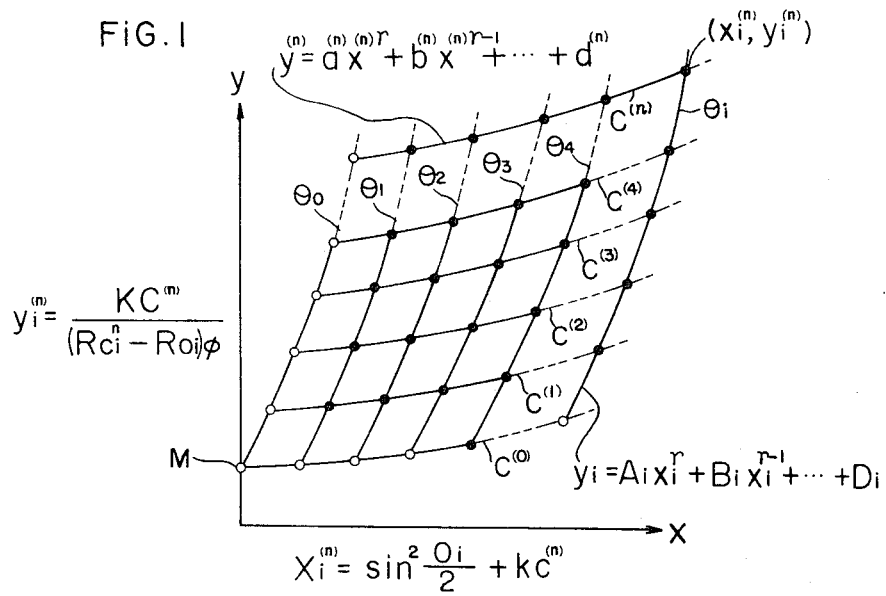

United States Patent
Kozawa et al.

[15] 3,659,946
[45] May 2, 1972

[54] AUTOMATED LIGHT SCATTERING PHOTOMETER

[72] Inventors: Schichibei Kozawa; Hideki Yamamoto, both of Kyoto City, Japan

[73] Assignee: Shimadzu Seisakusho Ltd., Nakakyo-ku, Kyoto-shi, Kyoto-fu, Japan

[22] Filed: Dec. 9, 1970

[21] Appl. No.: 96,508

[30] Foreign Application Priority Data

Dec. 10, 1969 Japan..................................44/117890
Dec. 10, 1969 Japan..................................44/99600

[52] U.S. Cl............................356/104, 250/218, 356/208
[51] Int. Cl................G01n 21/00, G01n 21/06, G01n 21/26
[58] Field of Search.............................356/72, 102–104, 356/207–208; 250/218

[56] References Cited

UNITED STATES PATENTS

| | | | |
|---|---|---|---|
| 3,334,537 | 8/1967 | Beattie | 356/104 X |
| 3,342,099 | 9/1967 | Kaye | 356/104 X |
| 3,420,609 | 1/1969 | Kozawa | 250/218 X |

Primary Examiner—Ronald L. Wibert
Assistant Examiner—Warren A. Sklar
Attorney—Craig, Antonelli & Hill

[57] ABSTRACT

An automated light scattering photometer characterized in that a photoelectric unit used to measure the intensity of light scattered from the sample container at different angles relative to the optical axis of the instrument can be intermittently rotated. This can be achieved by the provision of a pair of switching means, one of which being adapted to be actuated by a pin vertically disposed on the upper surface of a rotary member mounted with said photoelectric unit and the other of which being adapted to be actuated by an actuator means rigidly mounted on a shaft for transmitting the rotational force from a motor to the rotary member. When these switches are closed at the same time, the rotation of the rotary member can be stopped by means of a clutch means. In addition, this photometer of the present invention can be utilized in connection with a commercially available computing machine. To this end, means for integrating the output of the photoelectric unit and that of another photoelectric unit is provided, the output of said integrating means being adapted to be applied to the computing machine.

12 Claims, 5 Drawing Figures

Patented May 2, 1972

3,659,946

2 Sheets-Sheet 1

INVENTORS
SHICHIBEI KOZAWA &
HIDEKI YAMAMOTO

BY Craig, Antonelli, Stewart + Hill

ATTORNEYS

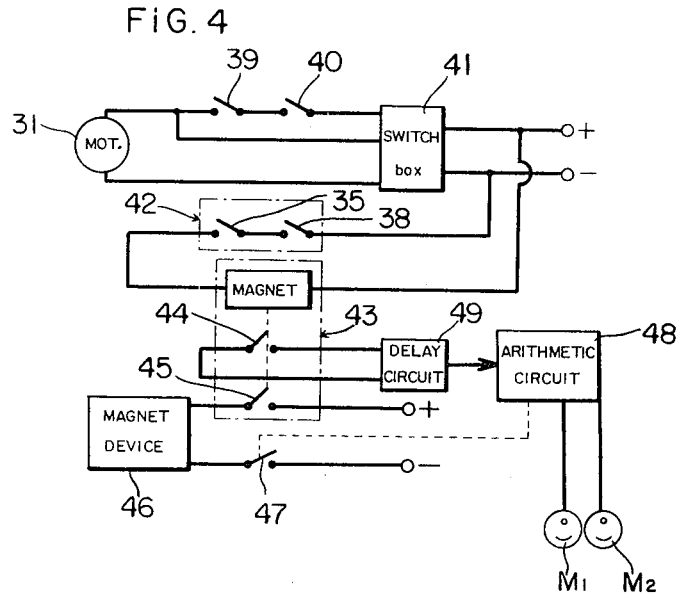
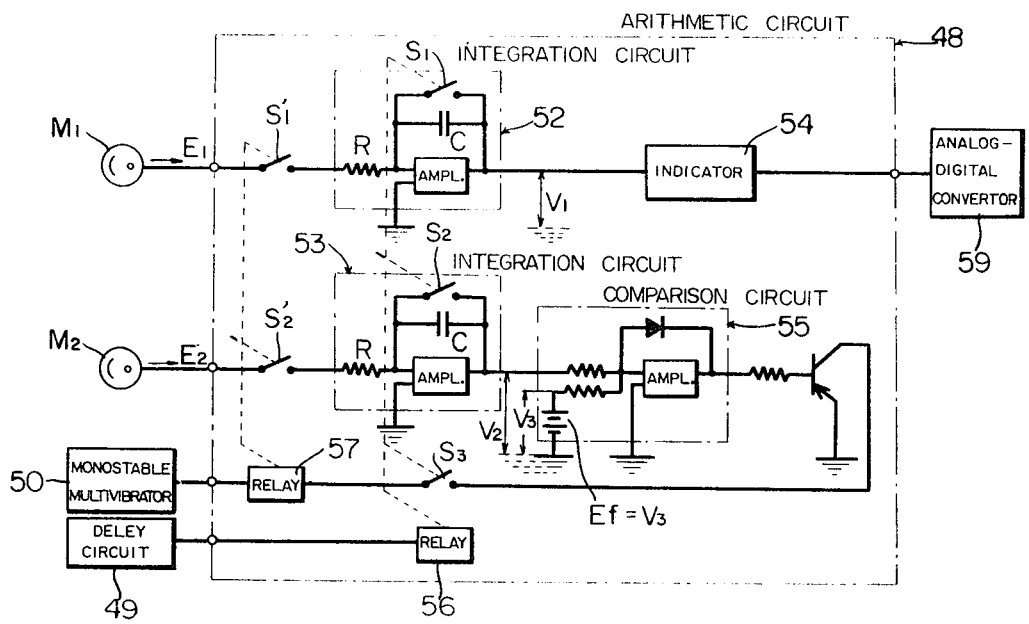

AUTOMATED LIGHT SCATTERING PHOTOMETER

The present invention relates to a light scattering photometer and, more particularly, to an automated light scattering photometer of photoelectric type which can be utilized in connection with a commercially available computing machine to obtain readily applicable data in respect of a sample to be analyzed.

It is well known that when a beam of light is passed through the material, scattering of the beam of the light takes place. By way of example, when such data as the molecular weight, radius of gyration of the molecule and interaction between the molecules of a solution of high molecular material to be analyzed are to be determined, measurement has been made with respect to the intensity of the beam of light thus scattered from the solution. Light scattering photometers are known as instruments used for this purpose and generally designed to measure and indicate and/or record the intensities of the beam of light scattered from the sample solution in various directions relative to the optical axis of the instrument.

However, to obtain the data with the use of a conventional photometer, the following procedures have been generally carried out:

I. The intensity $Io_i$ of light scattered in various directions, i.e., at different angles $\theta_i$ relative to the optical axis of the photometer is measured with respect to a solvent.

II. The intensity $Ic_i$ of light scattered in the different angles $\theta_i$ relative to the optical axis of the photometer is measured with respect to solutions of a high polymer prepared with the use of the solvent and having different concentrations $C_i$.

III. Each of the above intensities $Io_i$ and $Ic_i$ is corrected to the value per unit volume of the scattering material which is in turn multiplied by the Thomson coefficient. The results can be expressed in the following formulas:

$Ro_i = Io_i \sin \theta_i / (1 + \cos^2 \theta_i)$
$Rc_i = Ic_i \sin \theta_i / (1 + \cos^2 \theta_i)$ wherein $Ro_i$ and $Rc_i$ are reduced intensities related to the solvent and solutions, respectively.

IV. While $\sin^2 \theta_i/2 + kC^{(n)}$ wherein $k$ is an arbitrary constant is taken on the abscissa $X_i^{(n)}$ and $KC^{(n)}/\phi(Rc_i^{(n)}-Ro_i)$ is taken on the ordinate $Y_i^{(n)}$, a grid-like plot can be obtained which is generally called Zimm plot as shown in FIG. 1.

V. By extrapolating the Zimm plot thus obtained to both $C = 0$ and $\theta = 0$, coordinates $(x_n^{(n)}, y_n^{(n)})$ and $(x_i^o, y_i^o)$ are respectively determined.

VI. The molecular weight can be determined from the gradient at the ordinate as indicated by the point M in FIG. 1, when extrapolation is made to $C = 0$ and $\theta = 0$. VII. The second virial coefficient from which information concerning the interaction between the molecules can be determined from the gradient at the ordinate when extrapolation is made to $\theta = 0$.

VIII. The radius of gyration of the molecule can be determined from the gradient at the ordinate when extrapolation is made to $C = 0$.

Thus, the procedures for calculation to obtain the desired data are complicated and time-consuming to an extent that, in an extreme case, it will require half a day to obtain the desired data.

According to the U.S. Pat. numbered 3,420,609, patented to Kozawa and assigned to Shimadzu Seisakusho Ltd., the photometer of similar character has been successfully automated to an extent that the Zimm plot can be automatically formed by means of an X-Y recorder incorporated therein. However, the present invention pertains to an improvement over the above numbered patent to facilitate the application of a commercially available computing machine with respect to the light scattering photometer whereby the above mentioned inconveniences can be advantageously eliminated.

Accordingly, one essential object of the present invention is to provide a light scattering photometer of the character above referred to comprising means for angularly intermittently transporting a photoelectric unit from position to position about the axis of rotation for measuring the intensity of light scattered from a sample at different angles with respect to the optical axis of the photometer.

Another object of the present invention is to provide a light scattering photometer of the character above referred to comprising means for applying the measured intensities to a commercially available computing machine whereby the readily applicable data can be obtained.

A further object of the present invention is to provide a light scattering photometer of the character above referred to comprising means for integrating the output of a photoelectric unit capable of detecting the intensity of light scattered from the sample, means for integrating the output of a photoelectric unit capable of monitoring the intensity of light transmitted from a light source and means for comparing the outputs of the both integrating means to determine a ratio of difference between said outputs whereby the light source can be stabilized while relatively stable measured values can be obtained.

A still further object of the present invention is to provide a light scattering photometer of the character above referred to capable of utilizing a computing machine whereby the foregoing procedures heretofore necessaitated to obtain the data can be simplified.

According to the present invention, an accurate positioning of the photoelectric unit for measuring the intensity of light scattered from the sample at different angles with respect to the opitcal axis of the photometer can be advantageously appreciated. In addition, since the outputs of the both photoelectric units are integrated as time passes during the entire period of measurement, the both sensitivity and precision of the photometer can be advantageously improved.

Figure 2:
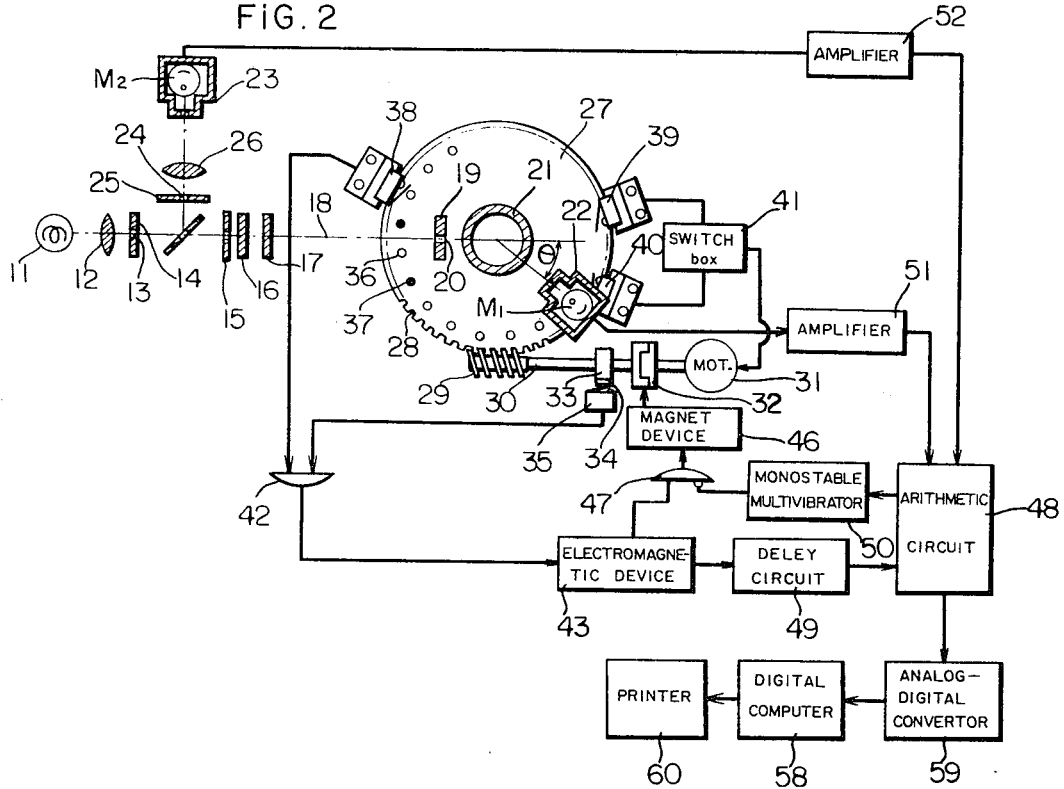

These and other objects and features will be apparent from the following description taken only in conjunction with a preferred embodiment of the present invention with reference to the accompanying drawings, in which:

FIG. 1 is a Zimm plot shown for a better understanding of the principle of the present invention, FIG. 2 is a block diagram showing a manner in which the mechanical portion is connected with the electric portion in the present invention, FIG. 3 is a schematic side view of a cam member employed in the mechanical portion shown in FIG. 2, FIG. 4 is a schematic diagram showing switching means operable by said cam member shown in FIG. 3, and FIG. 5 is a wiring diagram of an arithmetic circuit shown in the electric portion of FIG. 2.

Referring first to FIG. 2, an optical system of the photometer according to the present invention is schematically comprised of a suitable light source 11 and a condensing lens 12 disposed in alignment therewith for converging the light from the source 11 into a pinhole 13 formed in the plate 14. The light passing through the pinhole 13 is applied to a collimating lens 15 which is disposed in axial alignment with the above-mentioned optical elements and which renders the rays of light parallel. The parallel rays of light travel through a neutral filter 16 and a monochromatic filter 17. Along the optical axis 18 and rearwardly of the filter 17 there is disposed a plate 19 having a slit 20 of a desired area formed therein in alignment with the optical axis 18 so that the monochromatic light from the filter 17 is peripherally intercepted by the plate 19 and a desired central portion thereof passes through the slit 20 to arrive at a sample container 21 in which a solution, for example, of high polymer to be analyzed is contained. In this optical system, when the light enters the solution, it can be scattered in varying quantities and different directions by the molecules of the high polymer in the solution, some of the light thus scattered being adapted to be received by a photoelectric unit 22 having a phototube $M_1$ for receiving the scattered light and producing a voltage proportional to the quantity or intensity of light received thereby.

Another photoelectric unit 23 having a phototube $M_2$ is disposed between the plate 14 and the collimating lens 15 and transversely of the optical axis 18 so as to monitor the original intensity of light transmitted from the light source 11. This monitoring can be achieved in such a manner that the light passing through the pinhole 13 is in part reflected by a semitransparent mirror which is in turn transmitted to the photoelectric unit 23 through a pinhole 24 formed in another plate 25 and a condensing lens 26. This photoelectric unit 23 is similarly effective to produce a voltage proportional to the intensity of light received thereby.

In order to measure the scattered light intensity at various angles $\theta_i$ relative to the optical axis 18, the photoelectric unit 22 is so arranged as to be rotatable through a desired range of angle about the sample container 21. To this end, the photoelectric unit 22 is rigidly mounted on a rotary disk 27 formed on its periphery with a gear 28 in mesh with a worm gear 29 formed at one end of a connecting rod 30, the other end of said connecting rod 30 being connected with a motor 31 through an electromagnetic clutch 32 including a magnet device as will be mentioned later. The clutch 32 can be electrically operated so that, while the motor 31 is constantly driven, the rotary disk 27 can be intermittently rotated about the sample container 21.

The connecting rod 30 is provided between the worm gear 29 and the clutch 32 with a cam member 33 non-rotatably carried on said rod 30 and having a protrusion 34 particularly as shown on an enlarged scale in FIG. 3 for actuating a microswitch 35 when said protrusion 34 is brought into register with an actuator of said microswitch 35. This protrusion formed in the cam member 33 is so sized that the microswitch 35 can be actuated during a period of time in which the cam member 33 is rotated preferably 3.6°. Alternatively, the microswitch 35 may be designed so as to complete the circuit during said period. In either case, according to the preferred embodiment of the present invention, the arrangement is such that the rotary disk 27 can be rotated 0.05° about the sample container 21 each time when the microswitch 35 is actuated. In other words, since this microswitch 35 is adapted to disengage the clutch 32 as will be mentioned later, positioning of the photoelectric unit 22 at different angles $\theta_i$ relative to the optical axis 18 can be precisely performed with the maximum error of 0.05°.

The rotary disk 27 is formed on its upper surface with a plurality of holes 36 spaced at predetermined angular intervals, preferably every 5°, in the peripheral direction for receiving a plurality of pins 37 vertically extending at right angles to the plane of the rotary disk 27, the number of said pins 37 being corresponded with the number of said holes 36, but not limited thereto. However, in the case where measurement of the intensity of light scattered at every 10° relative to the optical axis 18, that is, in the case where the rotation of the disk 27 is to be intermittently performed at every 10° about the same container 21, the number of the vertically extending pins 37 may be half the number of the holes 36. The thickness of each of said pins 37 is defined such that a first switch 38 disposed adjacent to the periphery of the rotary disk 27 so as to be actuated by a selected one of said pins 36 can be actuated to generate an electric signal to an AND gate, as will be mentioned later, while the rotary disk 27 is rotated 2.5° to 5° about the sample container 21. However, by the reason as will be mentioned later, the duration in which the microswitch 35 is actuated so as to generate an electric signal to the AND gate should be within the duration in which the switch 38 is actuated so as to generate the electric signal to the same AND gate. For this purpose, the worm gear 39 is designed such that the rotary disk 27 can be rotated intermittently at every 5° per rotation of said worm gear 29.

Disposed adjacent to the periphery of the rotary disk 27 in a similar manner to the first switch 38 is a limit switch 39 and a second switch 40; the former being adapted to be actuated by a selected one of the pins 37 so as to cause the supply of current to the motor 31 thereby to stop the rotation of the disk 27 when the photoelectric unit 22 is rotated not less than 345° relative to the optical axis 18. However, it is to be noted that the rotary disk 27 can be rotated in the opposite directions between the initial position in which the photoelectric unit 22 is positioned at the angle of 10° relative to the optical axis 18 and the terminating position in which the photoelectric unit 22 is positioned at the angle of 345° relative thereto. This can be achieved by operating a switch box 41 electrically connected in such a manner as shown in FIG. 4. The switch 40 is adapted to be actuated by a selected one of the pins 37 so as to cease the supply of current to the motor 31 thereby to stop the rotation of the disk 27 from the terminating position to the initial position when the photoelectric unit 22 is returned back to the initial position. Thus, it will be clearly understood that the switch box 41 is designed so as to cause the motor 31 to be redriven whenever the rotary disk 27 or the photoelectric unit 22 completes its rotation in either direction towards the terminating position or the initial position.

While the mechanical portion of the photometer construction according to the present invention is so arranged, the microswitch 35 and the first switch 38 are connected to respective input terminals of the AND gate generally designated by 42 in FIG. 2 and FIG. 4. This gate 42 is in turn connected with an electromagnetic device 43 including first and second command switches 44 and 45 (FIG. 4), both of which being adapted to close when the output of said gate 42 is applied to said electromagnetic device 43. This can be achieved only when the AND gate 42 receives the respective electric signals from the switches 35 and 38 at the same time. The electromagnetic device 43 is on one hand connected with the clutch control magnet device 46 through an inhibitor element 47 which is normally in the ON position; and on the other hand connected with an arithmetic circuit, the details of which will be mentioned later with reference to FIG. 5.

The clutch arrangement is such that the clutch 32 can be disengaged so as to stop the rotation of the disk 27 intermittently at different angles relative to the optical axis 18 only when an electric signal is applied to the magnet device 46 from the electromagnetic device 43 through the inhibitor element 47. In other words, particularly with reference to FIG. 4, when the output of the AND gate 42 is applied to the electromagnetic device 43, the latter acts to close the command switches 44 and 45 so that current will in part flow to the arithmetic circuit 48 and in part to the magnet device 46.

The delay circuit 49 connected between the electromagnetic device 43 and the arithmetic circuit 48 acts to delay the application of an electric signal from said device 43 for a period of time required for the photoelectric unit 22 to be completely brought into a predetermined position in which measurement of the scattered light intensity takes place.

The clutch 32 that has been disengaged can be brought into the engaged position only when an electric signal is applied from the arithmetic circuit 48 through a monostable multivibrator to the inhibitor element 47 so as to cease the application of the signal from the electromagnetic device 43 to the magnet device 46.

Referring now to FIG. 5 in which the details of the arithmetic circuit 48 are shown, the voltage $E_1$ proportional to the intensity of the scattered light at an selected angle $\theta$ which is generated by the photoelectric unit 22 and the voltage $E_2$ proportional to the intensity of the light directly transmitted from the light source 11 which is generated by the another photoelectric unit 23 are both adapted to be applied to the arithmetic circuit 48 through respective amplifiers 51 and 52 (FIG. 2). This arithmetic circuit 48 includes a first integration circuit 52 for integrating the voltage $E_1$, a second integration circuit 53 for integrating the voltage $E_2$, an indicator 54 for indicating the ratio of the voltage $E_1$ to the voltage $E_2$ and a comparision circuit 55 to which an output voltage $V_2$ of the second integration circuit 53 can be applied.

As hereinbefore described, when the signal is applied to a first relay 56 from the electromagnetic device 43 through the delay circuit 49, relay switches $S_1$, $S_2$ and $S_3$ can be closed. A second relay 57 includes a pair of relay switch $S'_1$ and $S'_2$ each being normally in the ON position unless the relay 57 is energized. In this condition, upon closure of the relay switches $S_1$, $S_2$ and $S_3$, the voltages $E_1$ and $E_2$ can be respectively integrated, resulting in that either of the output voltages $V_1$ and $V_2$ of the respective integration circuits 52 and 53 is increased as time passes. However, the output voltage $V_2$ is in turn applied to the comparison circuit 55. The output of the comparison circuit 55 will reach the saturated value when the absolute value of the output voltage $V_2$ arrives at the predetermined absolute value of voltage $V_3$. (It is to be noted that the positive direction of the voltage $V_2$ is set to oppose to that of the voltage $V_3$.) Nevertheless, during this period measurement of the scattered light intensity by means of the photoelectric unit 22 takes place.

When the output voltage of the comparision circuit 55 reaches the saturated value as hereinbefore described, the relay 57 can be energized so as to cause the associated relay switches $S'_1$ and $S'_2$ to open whereby the photoelectric units 22 and 23 can be respectively brought into the inoperative position. The output voltage of the comparison circuit 55 used to energize the relay 57 is in turn applied to the inhibitor element 47 through the monostable multivibrator 50 as hereinbefore described with reference to FIG. 2. The relay 56 in the energized condition at this time can be disenergized when the clutch 46 is engaged and the cam member 33 is subsequently rotated thereby to cause the protrusion 34 to release the microswitch 35.

In the arithmetic circuit 48 so arranged as hereinbefore described, if the time between the moment when the switches $S_1$ and $S_2$ are closed to the moment when the output voltage of the comparison circuit 55 reaches the saturated value is assumed to be $t$, then the output of the integration circuit 52 will be:

$$V_1 = (k/RC)E_1 t \qquad 1.$$

where $k$ is a proportional constant, $R$ is the value of a resistor $R$ disposed at the input side of either of the integration circuits and $C$ is the capacity of a feedback condensor $C$. Similarly, the output of the integration circuit 53 will be:

$$V_2 = (k/RC)E_2 t = Ef \qquad 2.$$
$$\therefore t = Ef/(k/RC) E_2 \qquad 3.$$

By applying the equation (3) to the equation (1), $$V_1 = Ef(E_1/E_2) \qquad 4.$$

can be obtained. If this output voltage $V_1$ is supplied to the indicator 54, the ratio of the voltage $E_1$ to the voltage $E_2$ can be indicated thereby. Therefore, it will be understood that, even if the brightness of the light source 11 varies, this ratio will not be affected thereby so that the sensitivity of the device of the present invention can be considerably improved.

Referring back to FIG. 2, the arithmetic circuit 48 is in turn connected with a commercially available digital computer 58 through an analog-digital converter 59 in which the output of the arithmetic circuit 48 proportional to the measured value can be converted into digits. A printer device 60 is adapted to record the data read-out by the digital computer 58. The various constants $\phi$, $K$ and $k$ necessitated in calculation of the data such as hereinbefore described in connection with the procedures to obtain the data with the use of the photometer are stored in the computer 58. This computer 58 is adapted to perform the procedures III and IV to determine values of $X_i^{(n)}$ and $Y_i^{(n)}$. However, the coordinates $(x_o^{(n)}, y_o^{(n)})$ on a curve formed by extraporating to $\theta = 0$ and $(x_i^{(o)}, y_i^{(o)})$ on a curve formed by extraporating to $C = 0$ cannot be determined by the computer.

Therefore, according to the present invention, it is assumed that each curved passing coordinates $(x_i^{(n)}, y_i^{(n)})$ where $i = 1, 2, 3$ and so on and $n$ is constant can be expressed by the following equation:

$$y = a^{(n)}x^r + b^{(n)}x^{r-1} + \ldots + d^{(n)} \qquad 1.$$

where $a^{(n)}, b^{(n)}, \ldots d^{(n)}$ are coefficients determinable by the method of least square.

Similarly, it is assumed that each curve passing coordinates $(x_i^{(n)}, y_i^{(n)})$ where $i$ is constant and $n = 1, 2, 3$ and so on can be expressed by the following equation:

$$y = A_i x^r + B_i x^{r-1} + \ldots + D_i \qquad 2.$$

where $A_i, B_i, \ldots D_i$ are coefficients determinable by the method of least square. It is to be noted that $r = 2$ is generally sufficient in this case. Accordingly, when $\theta = 0$, then $$Y_o^{(n)} = a^{(n)} x_o^{(n)r} + b^{(n)} x_o^{(n)r-1} + \ldots + d^{(n)}$$

wherein $n$ is 1, 2, 3 and so on and the value of $x_o^{(n)}$ is therefore equal to $kC^{(n)}$. By means of a similar process, $$Y_i^o = A_i x_i^{(o)r} + B_i x_i^{(o)r-1}$$
$$+ \ldots + D_i \text{ wherein } i \text{ is } 1, 2, 3 \text{ and so on can be obtained.}$$

Since the molecular weight can be determined by the gradient of the extraporated curve at the Y-axis, this extraporated curve can be expressed by the following equation:

$$y_o = A_o x_o^r + B_o x_o^{r-1} + \ldots + D_o \text{ wherein } x_o^{(n)} \text{ is }$$

the value of $x_o'$, $x_o''$ and so on.

By determining $A_o, B_o \ldots D_o$ by the method of least square, it will be understood that $y_o^o = D_o$ when $x_o = 0$. Therefore, the molecular weight can be expressed by $1/D_o$.

From the above equation $y_o = A_o x_o^r + B_o x_o^{r-1} + \ldots + E_o X_o + D_o$, the second virial coefficient from which information concerning the interaction between the molecules can be determined can be expressed by $dy_o/dx_o$, that is, $E_o$.

The radius of gyration of each molecule can be given by determining the coefficients $a_o, b_o \ldots e_o$ and $d_o$ in the following equation by the method of least square:

$$y^{(o)} = a_o x^{(o)r} + b_o x^{(o)r-1} + \ldots + e_o x^{(o)} + d_o$$

wherein $x^{(o)}$ is the value of $x_1^{(o)}, x_2^{(o)}$ and so on. In other words, the radius of gyration can be expressed by $e_o$. Yet, $1/d_o$ is the molecular weight.

Although the present invention has been fully described in conjunction with the preferred embodiment wherein a plurality of pins are vertically inserted in a plurality of holes formed on the upper surface of the rotary disk, modification and change thereof are apparent to those skilled in the art. Furthermore, the inhibitor element herein used may be substituted with a flip-flop circuit without any reduction of the performance of the device of the present invention.

What is claimed is:

1. In a light scattering photometer comprising a source of light, light transmittable means for containing a sample to be analyzed, means for directing the light from the source to the sample, a first photoelectric means disposed rotatably about the sample for receiving light scattered from the sample at different angles relative to the direction of the incident light to produce an output proportional to the scattered light intensity, a second photoelectric means so fixedly disposed as to receive light transmitted from the light source to produce an output proportional to the intensity of light from the source and a drive means for rotating said first photoelectric means, the improvement comprising a rotary member connected with said first photoelectric means so as to rotate in synchronism with said rotary member; a first switch disposed adjacent to said rotary member; means on said rotary member for operating said first switch; means for transmitting a rotational force produced by said drive means to said rotary member so as to rotate said rotary member at a speed lower than the rotational speed of said drive means; a clutch means disposed at an intermediate portion of said transmitting means and including an electrically operable magnet means; a second switch disposed adjacent to said transmitting means; an actuator means on said transmitting means for operating said second switch; and means for generating an electrical signal to said magnet means so as to disengage said clutch means when both said first and second switches are actuated.

2. The light scattering photometer according to claim 1, wherein said operating means comprises a plurality of pins selectively insertable in a plurality of holes formed in the rotary member so spaced that the first photoelectric means can measure the scattered light intensity at different angles relative to the direction of the incident light.

3. The light scattering photometer according to claim 1, wherein said transmitting means comprises a connecting rod, one end of which being connected with an output shaft of said drive means through said clutch means and the other end being formed with a worm gear in mesh with a gear formed in said rotary member, said actuator means being mounted on said connecting rod between the clutch means and the worm gear.

4. The light scattering photometer according to claim 1, wherein said actuator means comprises a cam member having a protrusion for operating said second switch as said cam member is rotated in synchronism with said transmitting means.

5. The light scattering photometer according to claim 1, wherein said electric signal generating means comprises an "AND" circuit, an output of which can be generated only when both said first and second switches are actuated.

6. In a light scattering photometer comprising a source of light, light transmittable means for containing a sample to be analyzed, means for directing the light from the source to the sample, a first photoelectric means disposed rotatably about the sample for receiving light scattered from the sample at different angles relative to the direction of the incident light to produce an output proportional to the scattered light intensity, a second photoelectric means so fixedly disposed as to receive light transmitted from the light source to produce an output proportional to the intensity of light from the source and a drive means for rotating said first photoelectric means, the improvement comprising a rotary member connected with said first photoelectric means so as to rotate in synchronism with said rotary member; a first switch disposed adjacent to said rotary member; means on said rotary member for operating said first switch; means for transmitting a rotational force produced by said drive means to said rotary member so as to rotate said rotary member at a speed lower than the rotational speed of said drive means; a clutch means disposed at an intermediate portion of said transmitting means and including an electrically operable magnet means; a second switch disposed adjacent to said transmitting means; an actuator means on said transmitting means for operating said second switch; means for generating a first electrical signal to said magnet means so as to disengage said clutch means when both said first and second switches are actuated; an arithmetic circuit operable to be brought into the operative condition when both said first and second switches are actuated thereby to generate a second electrical signal; and means for receiving said second electrical signal from said arithmetic circuit to switch the first electrical signal produced by said generating means, so that the clutch means can be brought into the engaged position.

7. The light scattering photometer according to claim 6, wherein said arithmetic circuit comprises a pair of integration circuits to which the output of the first and second photoelectric means can be respectively applied and a circuit.

8. The light scattering photometer according to claim 7, wherein said arithmetic circuit determines the ratio of the output of the first electric means to the output of the second photoelectric means and generates an electrical signal to stop the operation of each of said integration circuits when the output of said arithmetic circuit reaches a predetermined value.

9. The light scattering photometer according to claim 6, wherein said means for receiving the second mentioned signal to switch the first mentioned signal thereby to engage the clutch means comprises an inhibit circuit.

10. The light scattering photometer according to claim 6, wherein said means for receiving the second mentioned signal to switch the first mentioned signal thereby to engage the clutch means comprises a flip-flop circuit.

11. In a light scattering photometer comprising a source of light, light transmittable means for containing a sample to be analyzed, means for directing the light from the source to the sample, a first photoelectric means disposed rotatably about the sample for receiving light scattered from the sample at different angles relative to the direction of the incident light to produce an output proportional to the scattered light intensity, a second photoelectric means so fixedly disposed as to receive light transmitted from the light source to produce an output proportional to the intensity of light from the source and a drive means for rotating said first photoelectric means, the improvement comprising a rotary member connected with said first photoelectric means so as to rotate in synchronism with said rotary member; a first switch disposed adjacent to said rotary member; means on said rotary member for operating said first switch; means for transmitting a rotational force produced by said drive means to said rotary member so as to rotate said rotary member at a speed lower than the rotational speed of said drive means; a clutch means disposed at an intermediate portion of said transmitting means and including an electrically operable magnet means; a second switch disposed adjacent to said transmitting means; an actuator means on said transmitting means for operating said second switch; means for generating a first electrical signal connected to said magnet means so as to disengage said clutch means when both said first and second switches are actuated; an arithmetic circuit operable to be brought into the operative condition when both said first and second switches are actuated thereby to generate second electrical signals, one of which being applied to a computing machine; and means capable of receiving said second electrical signals from said arithmetic circuit to switch the first mentioned electrical signal produced by said generating means, so that the clutch means can be brought into the engaged position.

12. In a light scattering photometer comprising a source of light, light transmittable means for containing a sample to be analyzed, means for directing the light from the source to the sample, a first photoelectric means disposed rotatably about the sample for receiving light scattered from the sample at different angles relative to the direction of the incident light to produce an output proportional to the scattered light intensity, a second photoelectric means so fixedly disposed as to receive light transmitted from the light source to produce an output proportional to the intensity of light from the source and a drive means for rotating said first photoelectric means, the improvement comprising a rotary member connected with said first photoelectric means so as to rotate in synchronism with said rotary member; a first switch disposed adjacent to said rotary member; means on said rotary member for operating said first switch; means for transmitting a rotational force produced by said drive means to said rotary member so as to rotate said rotary member at a speed lower than the rotational speed of said drive means; a clutch means disposed at an intermediate portion of said transmitting means and including an electrically operable magnet means; a second switch disposed adjacent to said transmitting means; an actuator means on said transmitting means for operating said second switch; means for generating first electrical signal connected to said magnet means so as to disengage said clutch means when both said first and second switches are actuated; an arithmetic circuit including a pair of integration circuits to which the outputs of the first and second photoelectric means can be respectively applied and operable to be brought into the operative condition when both said first and second switches are actuated, the output of one of said integration circuits being applied to a computing machine; a circuit to receive the output of the other integration circuit to determine the ratio of the output of the first photoelectric means to the output of the second photoelectric means; and means for receiving a second electric signal from said last mentioned circuit to switch the first electrical signal produced by said generating means, so that the clutch means can be brought into the engaged position.

* * * * *